United States Patent
Uebayashi et al.

(10) Patent No.: US 6,339,589 B1
(45) Date of Patent: Jan. 15, 2002

(54) FREQUENCY UTILIZATION METHOD IN MOBILE COMMUNICATION

(75) Inventors: Shinji Uebayashi; Etsuhiro Nakano; Seizou Onoe, all of Kanagawa-ken (JP)

(73) Assignee: NTT Mobile Communications Network Inc., Tokyo (JP)

( * ) Notice: Subject to any disclaimer, the term of this patent is extended or adjusted under 35 U.S.C. 154(b) by 0 days.

(21) Appl. No.: 09/145,218

(22) Filed: Sep. 1, 1998

(30) Foreign Application Priority Data

Sep. 1, 1997 (JP) .............................................. 9-236313

(51) Int. Cl.$^7$ .................................................. H04Q 7/00
(52) U.S. Cl. ........................ 370/329; 370/436; 370/442; 455/179.1; 455/464
(58) Field of Search ................................ 370/280, 329, 370/436, 442; 455/416, 179.1, 450, 464

(56) References Cited

U.S. PATENT DOCUMENTS

| | | | |
|---|---|---|---|
| 5,420,851 A | * | 5/1995 | Seshadri et al. ............. 370/280 |
| 5,640,395 A | * | 6/1997 | Hamalainen et al. ....... 370/322 |
| 6,016,311 A | * | 1/2000 | Gillbert et al. ............. 370/280 |
| 6,044,268 A | * | 3/2000 | Haartsen ..................... 455/426 |

* cited by examiner

*Primary Examiner*—Hassan Kizou
*Assistant Examiner*—Thien D Tran
(74) *Attorney, Agent, or Firm*—Oblon, Spivak, McClelland, Maier & Neustadt, P.C.

(57) ABSTRACT

A method of frequency utilization in mobile communication which is capable of realizing efficient frequency utilization in the case where widths of the uplink communication frequency bandwidth and the downlink communication frequency bandwidth are different in mobile communication is disclosed. Two pieces of carriers $U_1$ and $U_2$ among the uplink carriers $U_1$ to $U_6$ are selected as selected carriers, carriers $U_1$ to $U_6$ of the uplink bandwidth Wu and carriers $D_{1,1}$ to $D_{1,6}$ of the first downlink bandwidth Wd1 are set in one-to-one correspondence, the selected carriers $U_1$ and $U_2$ and carriers $D_{2,1}$ and $D_{2,2}$ of the second downlink bandwidth Wd2 are set in one-to-one correspondence, the communications are carried out by using $D_{1,1}$ and $D_{2,1}$ as downlink carriers in the case of using the selected carrier $U_1$ as an uplink carrier, and the communication are carried out by using only a corresponding carrier in the first downlink bandwidth Wd1 as a downlink carrier in the case of using a carrier other than the selected carrier as an uplink carrier.

5 Claims, 6 Drawing Sheets

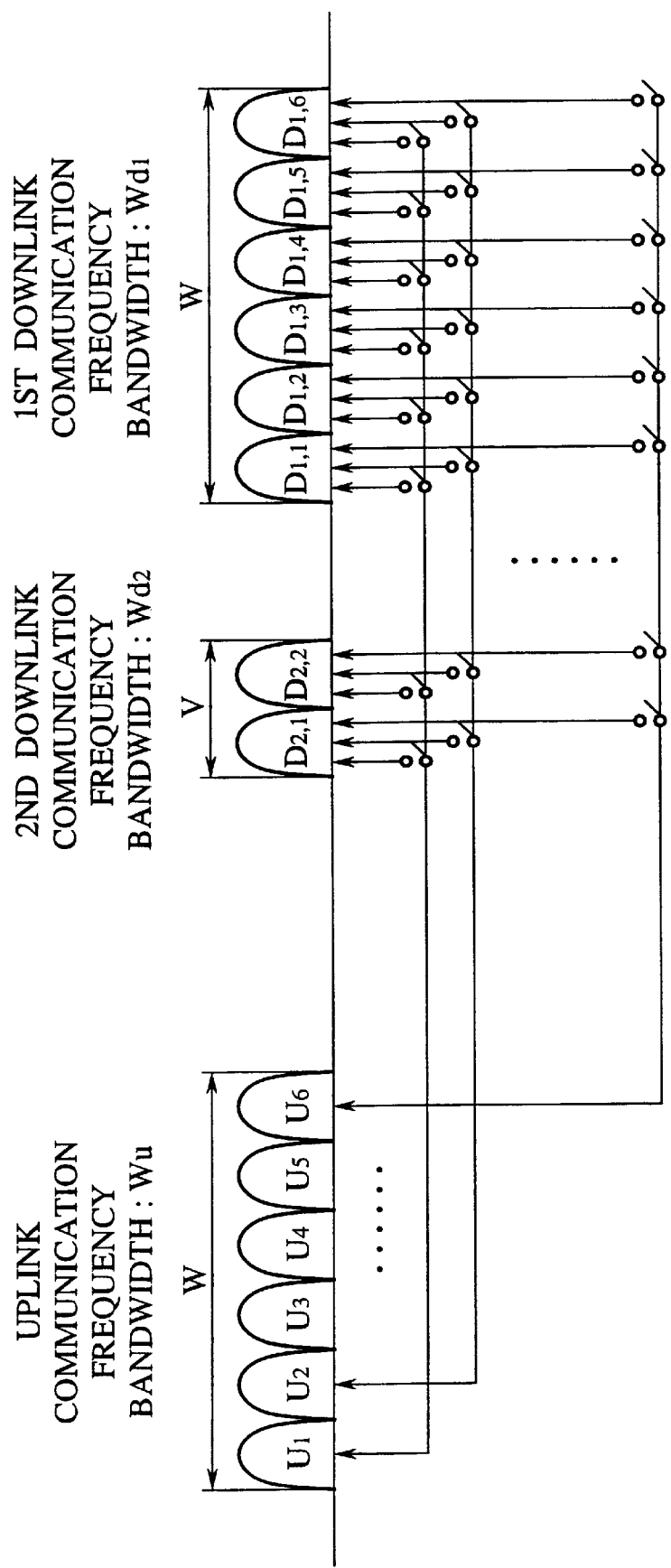

FREQUENCY UTILIZATION METHOD IN MOBILE COMMUNICATION

BACKGROUND OF THE INVENTION

1. Field of the Invention

The present invention relates to a method of frequency utilization in mobile communication in the case where mobile communication frequency bandwidths for uplink communications and downlink communications are not arranged symmetrically, and more specifically, to a method of frequency utilization in mobile communication which is effective in the case where uplink communication traffic is larger than downlink communication traffic.

2. Description of the Background Art

Conventionally, in the cellular mobile communication, bandwidths of the identical width have been used for uplink communication frequency bandwidth and downlink communication frequency bandwidth. Also, the conventional cellular mobile communication has been mainly speech communications in which a problem of having unbalanced uplink communication traffic and downlink communication traffic did not occur.

In conjunction with the recent rapid spread of mobile communication there is an increasing demand for newly allocating frequencies to mobile communication. However, the frequencies are getting stringent and it is now becoming difficult to arrange uplink communication frequency bandwidth and downlink communication frequency bandwidth symmetrically in the identical width as in conventional cases. Also, recently, data communications are becoming widespread even in mobile communication, and when actual mobile data communication service forms are considered, they are expected to be mostly of forms of utilization in which an access is made from a mobile terminal to a database connected to a fixed network and data are read out. In such cases, it is expected that downlink communication traffic becomes larger than uplink communication traffic. Consequently, it is practical as well as efficient to make the downlink communication frequency bandwidth wider than the uplink communication frequency bandwidth. However, a method of frequency utilization in the case where widths of the uplink communication frequency bandwidth and the downlink communication frequency bandwidth are different in cellular mobile communication has not been investigated conventionally.

SUMMARY OF THE INVENTION

Therefore an object of the present invention is to provide a method of frequency utilization in mobile communication which is capable of realizing efficient frequency utilization in the case where widths of the uplink communication frequency bandwidth and the downlink communication frequency bandwidth are different in cellular mobile communication.

According to one aspect of the present invention there is provided a method of frequency utilization in mobile communication having an uplink communication frequency bandwidth Wu which contains n pieces of carriers within a frequency bandwidth W, a first downlink communication frequency bandwidth Wd1 which contains n pieces of carriers within a frequency bandwidth W similarly, and a second downlink communication frequency bandwidth Wd2 which contains m pieces (m<n) of carriers within a frequency bandwidth V, the method of frequency utilization in mobile communication characterized by: selecting m pieces of carriers among the n pieces of uplink communication carriers as selected carriers; setting the n pieces of uplink communication carriers of the uplink communication frequency bandwidth Wu and the n pieces of downlink communication carriers of the first downlink communication frequency bandwidth Wd1 respectively in one-to-one correspondence; setting said m pieces of the selected carriers and the m pieces of downlink communication carriers of the second downlink communication frequency bandwidth Wd2 respectively in one-to-one correspondence; carrying out communications using a corresponding carrier in the first downlink communication frequency bandwidth Wd1 and a corresponding carrier in the second downlink communication frequency bandwidth Wd2 as downlink communication carriers in a case of using said selected carrier as an uplink communication carrier; and carrying out communications using only a corresponding carrier in the first downlink communication frequency bandwidth as a downlink communication carrier in a case of using a carrier other than said selected carrier as an uplink communication carrier.

According to another aspect of the present invention there is provided a method of frequency utilization in mobile communication having an uplink communication frequency bandwidth Wu which contains n pieces of carriers within a frequency bandwidth W, a first downlink communication frequency bandwidth Wd1 which contains n pieces of carriers within a frequency bandwidth W similarly, and a second downlink communication frequency bandwidth Wd2 which contains m pieces (m<n) of carriers within a frequency bandwidth V, the method of frequency utilization in mobile communication characterized by: selecting m pieces of carriers among the n pieces of uplink communication carriers as selected carriers; setting the n pieces of uplink communication carriers of the uplink communication frequency bandwidth Wu and the n pieces of downlink communication carriers of the first downlink communication frequency bandwidth Wd1 respectively in one-to-one correspondence; setting said m pieces of the selected carriers and the m pieces of downlink communication carriers of the second downlink communication frequency bandwidth Wd2 respectively in one-to-one correspondence; carrying out communications using either a corresponding carrier in the first downlink communication frequency bandwidth Wd1 or a corresponding carrier in the second downlink communication frequency bandwidth Wd2 as downlink communication carriers in a case of using said selected carrier as an uplink communication carrier; and carrying out communications using a corresponding carrier in the first downlink communication frequency bandwidth as a downlink communication carrier in a case of using a carrier other than said selected carrier as an uplink communication carrier.

According to another aspect of the present invention there is provided a method of frequency utilization in mobile communication having an uplink communication frequency bandwidth Wu which contains n pieces of carriers within a frequency bandwidth W, a first downlink communication frequency bandwidth Wd1 which contains n pieces of carriers within a frequency bandwidth W similarly, and a second downlink communication frequency bandwidth Wd2 which contains m pieces (m<n) of carriers within a frequency bandwidth V, the method of frequency utilization in mobile communication characterized by: setting the n pieces of uplink communication carriers of the uplink communication frequency bandwidth Wu and the n pieces of downlink communication carriers of the first downlink communication frequency bandwidth Wd1 respectively in one-to-one correspondence; setting the n pieces of uplink communication carriers of the uplink communication frequency bandwidth Wu and the m pieces of downlink communication carriers of the second downlink communication frequency bandwidth Wd2 respectively in multiple-to-one correspondence; and carrying out communications using both a carrier in the first downlink communication frequency bandwidth Wd1 and a carrier in the second downlink communication frequency bandwidth Wd2 which are corresponding to a carrier used in an uplink, as downlink communication carriers.

According to another aspect of the present invention there is provided a method of frequency utilization in mobile communication having an uplink communication frequency bandwidth Wu which contains n pieces of carriers within a frequency bandwidth W, a first downlink communication frequency bandwidth Wd1 which contains n pieces of carriers within a frequency bandwidth W similarly, and a second downlink communication frequency bandwidth Wd2 which contains m pieces (m<n) of carriers within a frequency bandwidth V, the method of frequency utilization in mobile communication characterized by: setting the n pieces of uplink communication carriers of the uplink communication frequency bandwidth Wu and the n pieces of downlink communication carriers of the first downlink communication frequency bandwidth Wd1 respectively in one-to-one correspondence; setting the n pieces of uplink communication carriers of the uplink communication frequency bandwidth Wu and the m pieces of downlink communication carriers of the second downlink communication frequency bandwidth Wd2 respectively in multiple-to-one correspondence; and carrying out communications using either a carrier in the first downlink communication frequency bandwidth Wd1 or a carrier in the second downlink communication frequency bandwidth Wd2 which is corresponding to a carrier used in an uplink, as a downlink communication carrier.

According to another aspect of the present invention there is provided a method of frequency utilization in mobile communication having an uplink communication frequency bandwidth Wu which contains n pieces of carriers within a frequency bandwidth W, a first downlink communication frequency bandwidth Wd1 which contains n pieces of carriers within a frequency bandwidth W similarly, and a second downlink communication frequency bandwidth Wd2 which contains m pieces (m<n) of carriers within a frequency bandwidth V, the method of frequency utilization in mobile communication characterized by: carrying out communications by selecting one or a plurality of carriers to be used in a downlink, independently from a carrier used in an uplink.

Other features and advantages of the present invention will become apparent from the following description taken in conjunction with the accompanying drawings.

BRIEF DESCRIPTION OF THE DRAWINGS

FIG. 6 is a figure for explaining a method of frequency utilization in mobile communication according to the sixth embodiment of the present invention.

DETAILED DESCRIPTION OF THE PREFERRED EMBODIMENTS

In the following, the embodiments of the present invention will be described using drawings.

Figure 1:
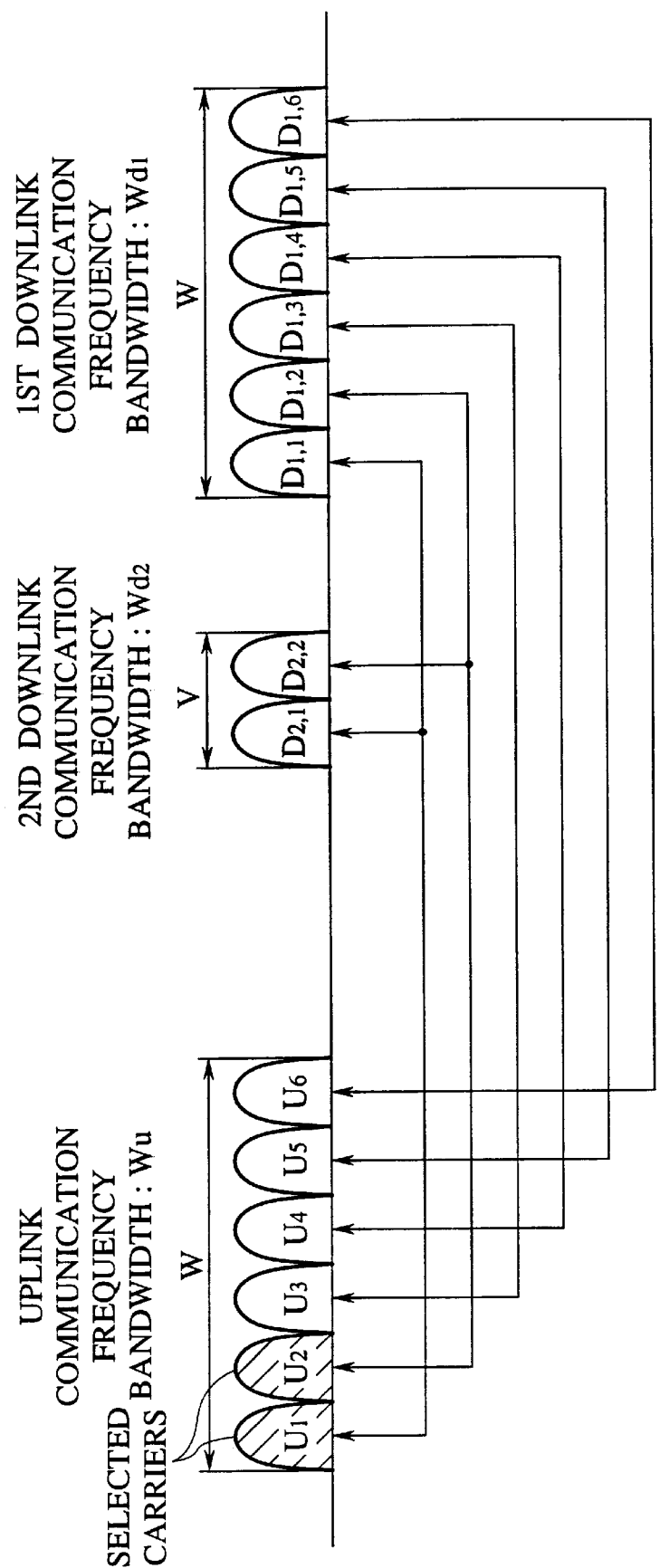
FIG. 1 is a figure for explaining a method of frequency utilization in mobile communication according to the first embodiment of the present invention.

FIG. 1 is a figure for explaining a method of frequency utilization in mobile communication according to the first embodiment of the present invention. In the same figure, three frequency bandwidths including an uplink communication frequency bandwidth Wu, a first downlink communication frequency bandwidth Wd1, and a second downlink communication frequency bandwidth Wd2 are allocated for mobile communication. The uplink communication frequency bandwidth Wu has a width of the bandwidth equal to W and contains six carriers $U_1$, $U_2$, $U_3$, $U_4$, $U_5$ and $U_6$. The first downlink communication frequency bandwidth Wd1 also has a width of the bandwidth equal to W and contains six carries $D_{1,1}$, $D_{1,2}$, $D_{1,3}$, $D_{1,4}$, $D_{1,5}$ and $D_{1,6}$, similarly as the uplink communication frequency bandwidth Wu. The second downlink communication frequency bandwidth Wd2 has a width of the bandwidth equal to V and contains two carries $D_{2,1}$ and $D_{2,2}$.

Among the six uplink communication carriers $U_1$ to $U_6$ in the uplink communication frequency bandwidth Wu, two carriers $U_1$ and $U_2$ are selected as selected carriers. Also, the six uplink communication carriers $U_1$, $U_2$, $U_3$, $U_4$, $U_5$ and $U_6$ of the uplink communication frequency bandwidth Wu and the six downlink communication carriers $D_{1,1}$, $D_{1,2}$, $D_{1,3}$, $D_{1,4}$, $D_{1,5}$ and $D_{1,6}$ of the first downlink communication frequency bandwidth Wd1 are respectively set in one-to-one correspondence, while the two selected carriers $U_1$ and $U_2$ and the two downlink communication carriers $D_{2,1}$ and $D_{2,2}$ of the second downlink communication frequency bandwidth Wd2 are respectively set in one-to-one correspondence.

Then, in the case of using the selected carrier $U_1$ or $U_2$ for high speed communications as an uplink communication carrier, the communications are carried out using the corresponding carrier $D_{1,1}$ or $D_{1,2}$ in the first downlink communication frequency bandwidth Wd1 and the corresponding carrier $D_{2,1}$ or $D_{2,2}$ in the second downlink communication frequency bandwidth Wd2 as downlink communication carriers, and in the case of using carrier ($U_3$, $U_4$, $U_5$, $U_6$) other than the selected carriers $U_1$ and $U_2$ as an uplink communication carrier, the communications are carried out using the corresponding carrier ($D_{1,3}$, $D_{1,4}$, $D_{1,5}$, $D_{1,6}$) in the first downlink communication frequency bandwidth Wd1 as a downlink communication carrier. For example, a user who carries out high speed communications uses the selected carrier $U_1$ as an uplink communication carrier for instance and the communications are carried out using the corresponding carrier $D_{1,1}$ of the first downlink bandwidth Wd1 and the corresponding carrier $D_{2,1}$ of the second downlink bandwidth Wd2 as downlink communication carriers.

By realizing the frequency utilization in this way, it is possible to use a two times wider bandwidth for the downlink so that it becomes possible to realize high speed downlink data communications or the like. Also, a general user carries out communications using an uplink carrier $U_3$ and a downlink carrier $D_{1,3}$ for instance.

Figure 2:
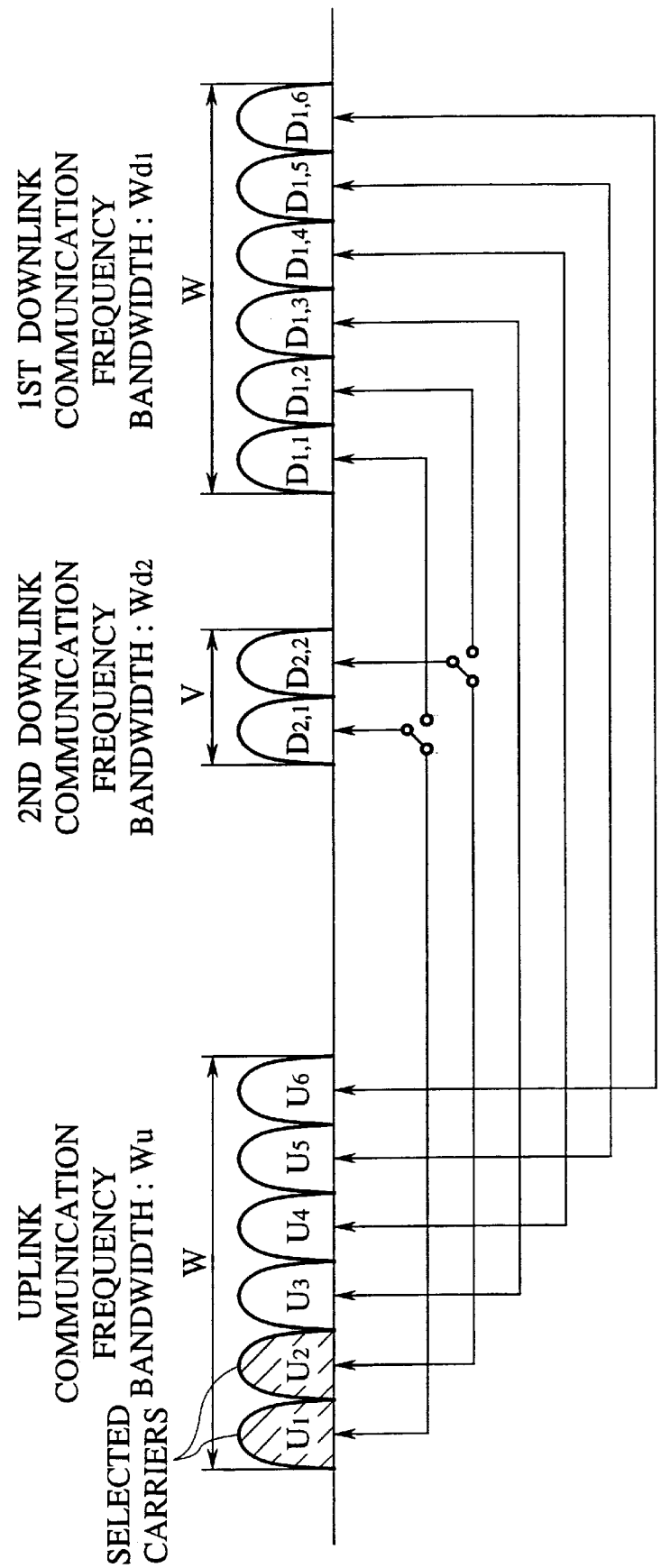
FIG. 2 is a figure for explaining a method of frequency utilization in mobile communication according to the second embodiment of the present invention.

FIG. 2 is a figure for explaining a method of frequency utilization according to the second embodiment of the present invention. In this embodiment, three frequency bandwidths including the uplink communication frequency bandwidth Wu, the first downlink communication frequency bandwidth Wd1 and the second downlink communication frequency bandwidth Wd2 in the similar configuration as in the first embodiment of FIG. 1 are allocated for mobile communication, and the same correspondences as in the first embodiment of FIG. 1 are set. Also, among uplink communication carriers $U_1$ to $U_6$ in the uplink communication frequency bandwidth Wu, two carriers $U_1$ and $U_2$ are selected as selected carriers.

Then, in the case of using the selected carrier $U_1$ or $U_2$ for high speed communications as an uplink communication carrier, the communications are carried out using the corresponding carrier $D_{1,1}$ or $D_{1,2}$ in the first downlink communication frequency bandwidth Wd1 or the corresponding carrier $D_{2,1}$ or $D_{2,2}$ in the second downlink communication frequency bandwidth Wd2 as a downlink communication carrier, and in the case of using carrier ($U_3$, $U_4$, $U_5$, $U_6$) other than the selected carriers $U_1$ and $U_2$ as an uplink communication carrier, the communications are carried out using the corresponding carrier ($D_{1,3}$, $D_{1,4}$, $D_{1,5}$, $D_{1,6}$) in the first downlink communication frequency bandwidth Wd1 as a downlink communication carrier. For example, a user who uses the selected carrier $U_1$ as an uplink communication carrier carries out the communications using the corresponding carrier $D_{1,1}$ of the first downlink bandwidth Wd1 or the corresponding carrier $D_{2,1}$ of the second downlink bandwidth Wd2 as a downlink communication carrier.

By realizing the frequency utilization in this way, although the width of the bandwidth is unchanged, the number of users who use the the same carrier is reduced to a half so that it becomes possible to realize high quality and high speed downlink communications in the case of using CDMA scheme.

Figure 3:
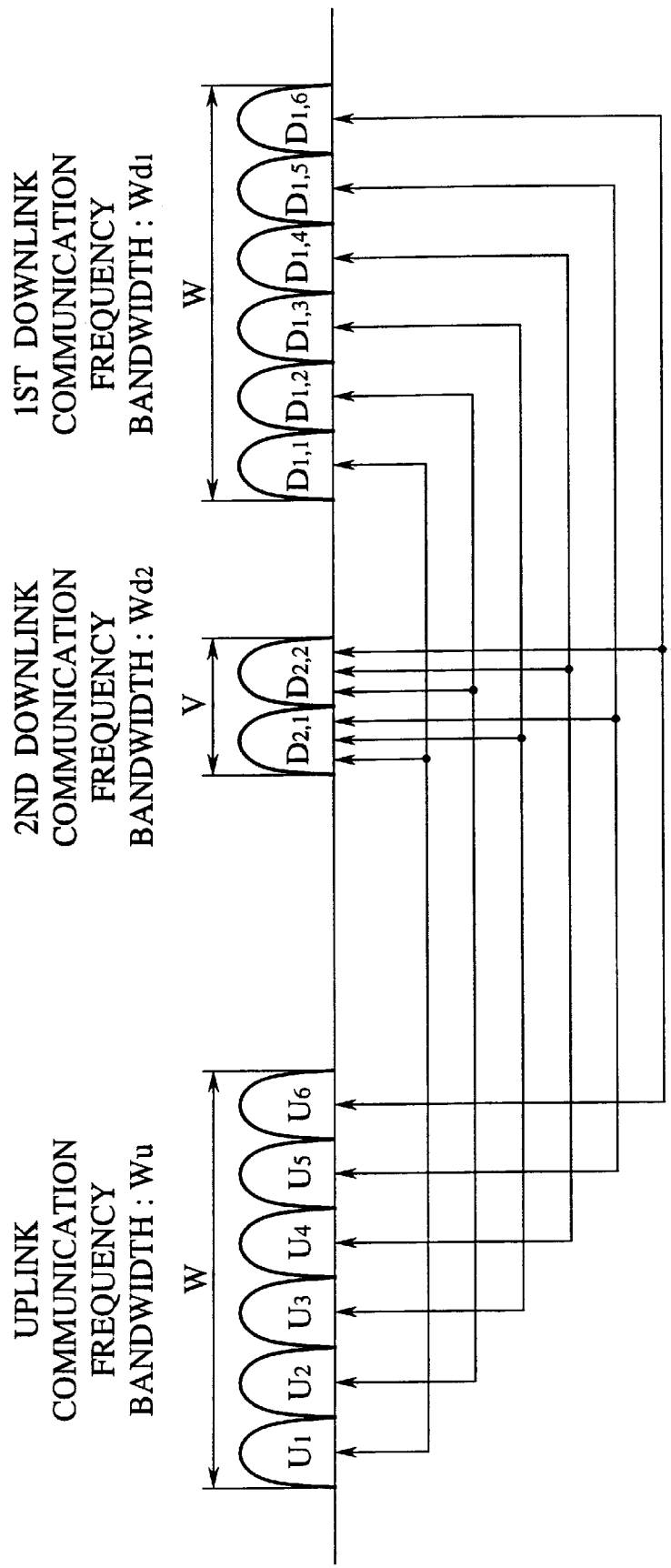
FIG. 3 is a figure for explaining a method of frequency utilization in mobile communication according to the third embodiment of the present invention.

FIG. 3 is a figure for explaining a method of frequency utilization according to the third embodiment of the present invention. In this embodiment, also, three frequency bandwidths including the uplink communication frequency bandwidth Wu, the first downlink communication frequency bandwidth Wd1 and the second downlink communication frequency bandwidth Wd2 in the similar configuration as in the first embodiment of FIG. 1 are allocated for mobile communication. Then, the correspondence between the six uplink carriers $U_1$, $U_2$, $U_3$, $U_4$, $U_5$ and $U_6$ of the uplink communication frequency bandwidth Wu and the six downlink carriers $D_{1,1}$, $D_{1,2}$, $D_{1,3}$, $D_{1,4}$, $D_{1,5}$ and $D_{1,6}$ is one-to-one correspondence similarly as in the first embodiment of FIG. 1, but the six uplink carriers $U_1$, $U_2$, $U_3$, $U_4$, $U_5$ and $U_6$ of the uplink communication frequency bandwidth Wu and the two downlink carriers $D_{2,1}$ and $D_{2,2}$ of the second downlink communication frequency bandwidth Wd2 are set in multiple-to-one correspondences, that is, multiple-to-one correspondences such as $U_1$–$D_{2,1}$, $U_2$–$D_{2,2}$, $U_3$–$D_{2,1}$, $U_4$–$D_{2,2}$, $U_5$–$D_{2,1}$, and $U_6$–$D_{2,2}$.

Then, the communication are carried out using both a carrier of the first downlink communication frequency bandwidth Wd1 and a carrier of the second downlink communication frequency bandwidth Wd2 which are corresponding to a carrier used in the uplink, as downlink communication carriers. For example, a user who uses $U_1$ as an uplink carrier will use a downlink carrier $D_{1,1}$ of the first downlink communication frequency bandwidth Wd1 and a downlink carrier $D_{2,1}$ of the second downlink communication frequency bandwidth Wd2 as downlink carriers.

In this embodiment, it is possible to realize high speed communications regardless of which carrier is used for uplink communications.

Figure 4:
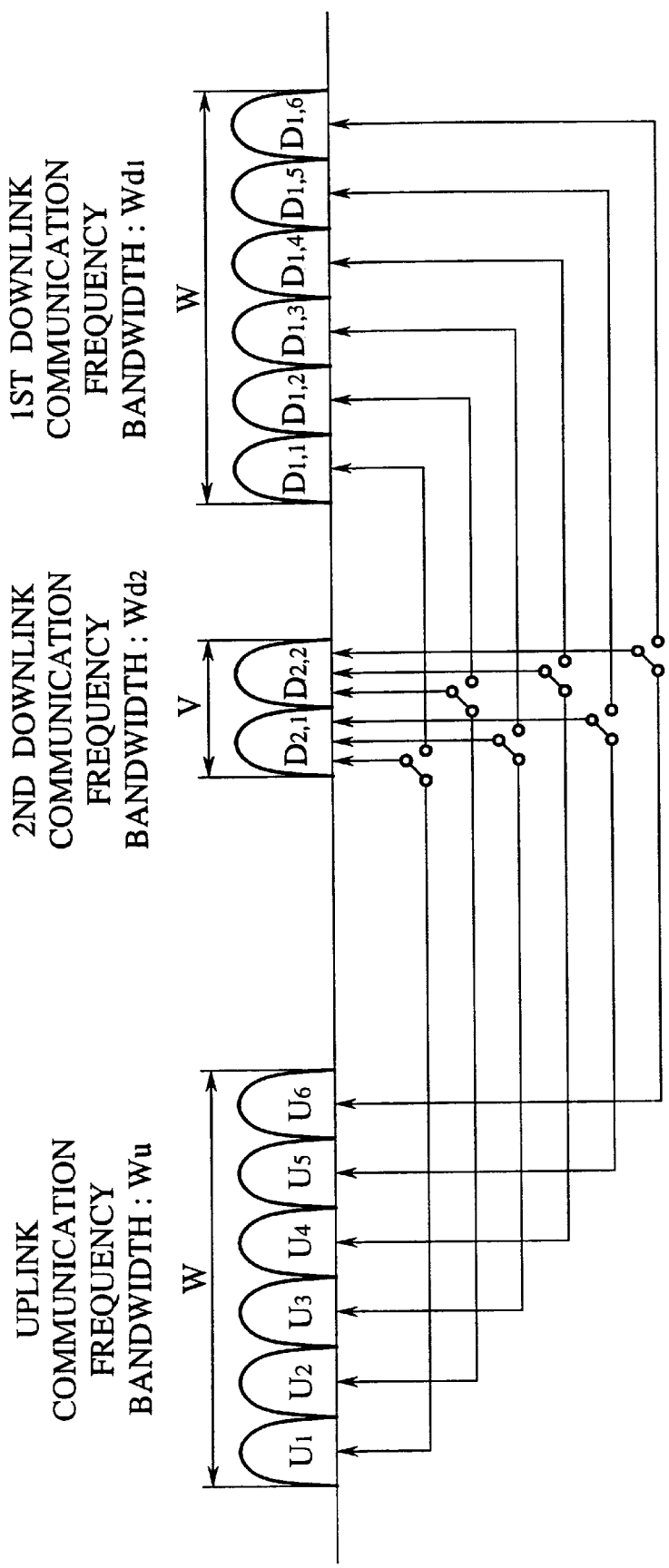
FIG. 4 is a figure for explaining a method of frequency utilization in mobile communication according to the fourth embodiment of the present invention.

FIG. 4 is a figure for explaining a method of frequency utilization according to the fourth embodiment of the present invention. In this embodiment, three frequency bandwidths including the uplink communication frequency bandwidth Wu, the first downlink communication frequency bandwidth Wd1 and the second downlink communication frequency bandwidth Wd2 in the similar configuration as in the first embodiment of FIG. 1 are allocated for mobile communication, and the same correspondences as in the third embodiment of FIG. 3 are set.

Then, the communication are carried out using either a carrier of the first downlink communication frequency bandwidth Wd1 or a carrier of the second downlink communication frequency bandwidth Wd2 which is corresponding to a carrier used in the uplink, as a downlink communication carrier. For example, in the case of using $U_1$ as an uplink carrier, either $D_{1,1}$ or $D_{2,1}$ can be used as a downlink carrier. Namely, in this embodiment, a downlink communication carrier can be selected from two carriers regardless of which carrier is used for uplink communications. Consequently, in this embodiment, it is possible to smooth out traffic by effectively utilizing the wide downlink bandwidth.

Figure 5:
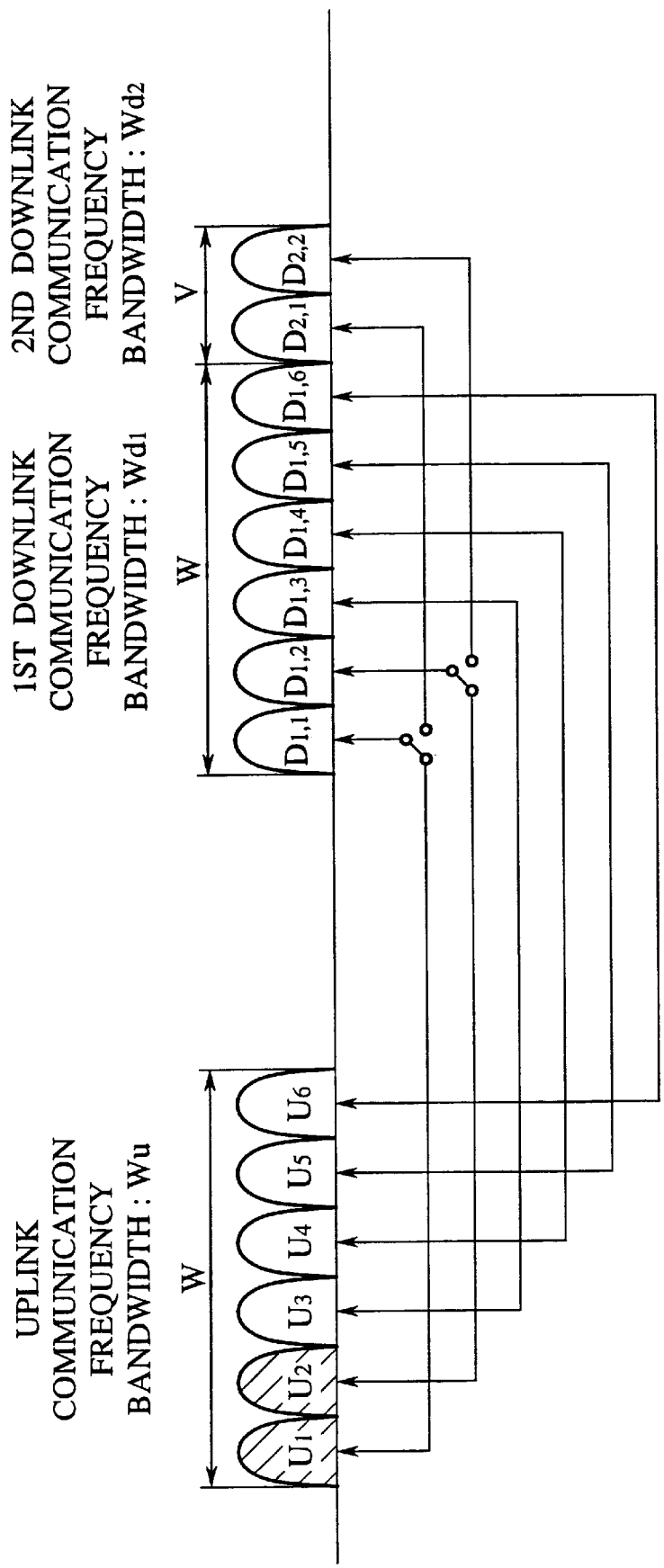
FIG. 5 is a figure for explaining a method of frequency utilization in mobile communication according to the fifth embodiment of the present invention.

FIG. 5 is a figure for explaining a method of frequency utilization according to the fifth embodiment of the present invention. In the first to fourth embodiments described above, the cases where the first downlink communication frequency bandwidth Wd1 and the second downlink communication frequency bandwidth Wd2 are separated have been described, whereas this embodiment shows a case where the first downlink communication frequency bandwidth Wd1 and the second downlink communication frequency bandwidth Wd2 are continuous as shown in the figure.

This embodiment is showing a case where the first downlink communication frequency bandwidth Wd1 and the second downlink communication frequency bandwidth Wd2 are continuous in the second embodiment shown in FIG. 2 as an example, and its method of frequency utilization is the same as in the second embodiment. It is similarly applicable to the other embodiments as well. In this fifth embodiment, only the allocated frequency bandwidths are different and the similar effects as in the first to fourth embodiments can be achieved.

FIG. 6 is a figure for explaining a method of frequency utilization according to the sixth embodiment of the present invention. In this embodiment, the uplink communication carriers and the downlink communication carriers are not set in correspondence.

In this embodiment, the communications can be carried out by selecting one or a plurality of carriers to be used in the downlink, independently from a carrier used in the uplink. Namely, regardless of which one of the uplink communication carriers $U_1$, $U_2$, $U_3$, $U_4$, $U_5$ and $U_6$ is used as an uplink communication carrier, arbitrary carrier can be selected as a downlink communication carrier from eight carriers including carriers $D_{1,1}$, $D_{1,2}$, $D_{1,3}$, $D_{1,4}$, $D_{1,5}$ and $D_{1,6}$ of the first downlink communication frequency bandwidth Wd1 and carriers $D_{2,1}$ and $D_{2,2}$ of the second downlink communication frequency bandwidth Wd2, and in this case a plurality of carriers may be selected.

In this embodiment, as in each embodiment described above, when the uplink communication frequency bandwidth and the downlink communication frequency bandwidth have different widths, it is possible to allocate a wide bandwidth to high speed communications or smooth out traffic and it is possible to realize an efficient frequency utilization.

Note that each embodiment described above has been described by assuming that the downlink communication traffic is larger than the uplink communication traffic and presupposing that the downlink communication frequency bandwidth is wider than the uplink communication frequency bandwidth, but the similar method is also applicable to the reverse case as well.

As described above, according to the present invention, m pieces among the uplink carriers are selected as selected carriers, carriers of the uplink bandwidth and carriers of the first downlink bandwidth are set in one-to-one correspondence, the selected carriers and carriers of the second downlink bandwidth are set in one-to-one correspondence, and the communications are carried out by using the corresponding carrier of the first downlink bandwidth and the corresponding carrier of the second downlink bandwidth as downlink carriers in the case of using the selected carrier as an uplink carrier, so that two times wider bandwidth can be used for the downlink and it is possible to realize high speed downlink data communications or the like.

Also, according to the present invention, m pieces among the uplink carriers are selected as selected carriers, carriers of the uplink bandwidth and carriers of the first downlink bandwidth are set in one-to-one correspondence, the selected carriers and carriers of the second downlink bandwidth are set in one-to-one correspondence, and the communications are carried out by using the corresponding carrier of the first downlink bandwidth or the corresponding carrier of the second downlink bandwidth as a downlink carrier in the case of using the selected carrier as an uplink carrier, so that the number of users who uses the identical carrier can be reduced to a half and it is possible to realize high quality and high speed downlink communications in the case of using CDMA scheme.

Moreover, according to the present invention, carriers of the uplink bandwidth and carriers of the first downlink bandwidth are set in one-to-one correspondence, carriers of the uplink bandwidth and carriers of the second downlink bandwidth are set in multiple-to-one correspondence, and the communications are carried out by using both a carrier of the first downlink bandwidth and a carrier of the second downlink bandwidth which are corresponding to the carrier used in the uplink, as downlink communication carriers, so that it is possible to realize high speed communications regardless of which carrier is used for the uplink communications.

According to the present invention, carriers of the uplink bandwidth and carriers of the second downlink bandwidth are set in one-to-one correspondence, carriers of the uplink bandwidth and carriers of the second downlink bandwidth are set in multiple-to-one correspondence, and the communications are carried out by using either a carrier of the first downlink bandwidth or a carrier of the second downlink bandwidth which is corresponding to the carrier used in the uplink, as a downlink communication carrier, so that it is possible to smooth out traffic by using the wide downlink bandwidth effectively.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of frequency utilization in mobile communication having an uplink communication frequency bandwidth Wu which contains n pieces of carriers within a frequency bandwidth W, a first downlink communication frequency bandwidth Wd1 which contains n pieces of carriers within a frequency bandwidth W similarly, and a second downlink communication frequency bandwidth Wd2 which contains m pieces (m<n) of carriers within a frequency bandwidth V, the method of frequency utilization in mobile communication characterized by:

selecting m pieces of carriers among the n pieces of uplink communication carriers as selected carriers;

setting the n pieces of uplink communication carriers of the uplink communication frequency bandwidth Wu and the n pieces of downlink communication carriers of the first downlink communication frequency bandwidth Wd1 respectively in one-to-one correspondence;

setting said m pieces of the selected carriers and the m pieces of downlink communication carriers of the second downlink communication frequency bandwidth Wd2 respectively in one-to-one correspondence;

carrying out communications using a corresponding carrier in the first downlink communication frequency bandwidth Wd1 and a corresponding carrier in the second downlink communication frequency bandwidth Wd2 as downlink communication carriers in a case of using said selected carrier as an uplink communication carrier; and carrying out communications using only a corresponding carrier in the first downlink communication frequency bandwidth as a downlink communication carrier in a case of using a carrier other than said selected carrier as an uplink communication carrier.

2. A method of frequency utilization in mobile communication having an uplink communication frequency bandwidth Wu which contains n pieces of carriers within a frequency bandwidth W, a first downlink communication frequency bandwidth Wd1 which contains n pieces of carriers within a frequency bandwidth W similarly, and a second downlink communication frequency bandwidth Wd2 which contains m pieces (m<n) of carriers within a frequency bandwidth V, the method of frequency utilization in mobile communication characterized by:

selecting m pieces of carriers among the n pieces of uplink communication carriers as selected carriers;

setting the n pieces of uplink communication carriers of the uplink communication frequency bandwidth Wu and the n pieces of downlink communication carriers of the first downlink communication frequency bandwidth Wd1 respectively in one-to-one correspondence;

setting said m pieces of the selected carriers and the m pieces of downlink communication carriers of the second downlink communication frequency bandwidth Wd2 respectively in one-to-one correspondence;

carrying out communications using either a corresponding carrier in the first downlink communication frequency bandwidth Wd1 or a corresponding carrier in the second downlink communication frequency bandwidth Wd2 as downlink communication carriers in a case of using said selected carrier as an uplink communication carrier; and carrying out communications using a corresponding carrier in the first downlink communication frequency bandwidth as a downlink communication carrier in a case of using a carrier other than said selected carrier as an uplink communication carrier.

3. A method of frequency utilization in mobile communication having an uplink communication frequency bandwidth Wu which contains n pieces of carriers within a frequency bandwidth W, a first downlink communication frequency bandwidth Wd1 which contains n pieces of carriers within a frequency bandwidth W similarly, and a second downlink communication frequency bandwidth Wd2 which contains m pieces (m<n) of carriers within a frequency bandwidth V, the method of frequency utilization in mobile communication characterized by:

setting the n pieces of uplink communication carriers of the uplink communication frequency bandwidth Wu and the n pieces of downlink communication carriers of the first downlink communication frequency bandwidth Wd1 respectively in one-to-one correspondence;

setting the n pieces of uplink communication carriers of the uplink communication frequency bandwidth Wu and the m pieces of downlink communication carriers of the second downlink communication frequency bandwidth Wd2 respectively in multiple-to-one correspondence; and carrying out communications using both a carrier in the first downlink communication frequency bandwidth Wd1 and a carrier in the second downlink communication frequency bandwidth Wd2 which are corresponding to a carrier used in an uplink, as downlink communication carriers.

4. A method of frequency utilization in mobile communication having an uplink communication frequency bandwidth Wu which contains n pieces of carriers within a frequency bandwidth W, a first downlink communication frequency bandwidth Wd1 which contains n pieces of carriers within a frequency bandwidth W similarly, and a second downlink communication frequency bandwidth Wd2 which contains m pieces (m<n) of carriers within a frequency bandwidth V, the method of frequency utilization in mobile communication characterized by:

setting the n pieces of uplink communication carriers of the uplink communication frequency bandwidth Wu and the n pieces of downlink communication carriers of the first downlink communication frequency bandwidth Wd1 respectively in one-to-one correspondence;

setting the n pieces of uplink communication carriers of the uplink communication frequency bandwidth Wu and the m pieces of downlink communication carriers of the second downlink communication frequency bandwidth Wd2 respectively in multiple-to-one correspondence; and carrying out communications using either a carrier in the first downlink communication frequency bandwidth Wd1 or a carrier in the second downlink communication frequency bandwidth Wd2 which is corresponding to a carrier used in an uplink, as a downlink communication carrier.

5. A method of frequency utilization in mobile communication having:

an uplink communication frequency bandwidth Wu which contains n pieces of carriers within a frequency bandwidth W, a first downlink communication frequency bandwidth Wd1 which contains n pieces of carriers within a frequency bandwidth W similarly, and a second downlink communication frequency bandwidth Wd2 which contains m pieces (m<n) of carriers within a frequency bandwidth V;

the method comprising:

carrying out a first type of communications by selecting one carrier to be used in a first downlink, independently from a carrier used in an uplink; and carrying out a second type of communications by selecting a plurality of carriers to be used in a second downlink, independently from the carrier used in the uplink.

* * * * *